Sept. 30, 1930.    N. R. CARR ET AL    1,776,782
ANIMAL SNARE
Filed Nov. 26, 1927

Norman R. Carr
Claude C. Miller
Inventors

By their Attorneys Marks & Clerk.

Patented Sept. 30, 1930

1,776,782

UNITED STATES PATENT OFFICE

NORMAN R. CARR AND CLAUDE C. MILLER, OF LITITZ, PENNSYLVANIA, ASSIGNORS TO ANIMAL TRAP COMPANY OF AMERICA, OF LITITZ, PENNSYLVANIA, A CORPORATION OF PENNSYLVANIA

ANIMAL SNARE

Application filed November 26, 1927. Serial No. 235,794.

The present invention relates to snares of the kind comprising a cord or cable ending in a running noose adapted to be arranged in runways or other suitable spots likely to be frequented by the animals to be caught. Such snares as usually arranged for large animals comprise trigger means for releasing means exerting a powerful pull on the cord such as a bent-over sapling or spring whereby when the animal springs the snare the noose is drawn tight about some part, such as its leg or neck, the pull of the spring being relied upon to hold the bight of the snare tightly around said part.

Snares of the running noose type while simple and inexpensive, have certain drawbacks, for example, they entail somewhat more work in setting than the spring jaw traps which may be merely placed on the ground in a suitable spot, whereas the running noose has to be arranged and provided with means for tensioning, and means for releasing. While all these parts may be fashioned from undergrowth at hand, this preparation entails expenditure of time.

The snare is also liable to be sprung by game other than that desired to be trapped, since the releasing trigger is desirably set to be operated by a slight pressure such as may be caused by a much smaller animal than that desired to be trapped. These animals if held in the trap disclose by their cries the spot where the trap is placed, with the result that this spot will be duly noted and avoided for a considerable period by other animals. In order to avoid this latter disadvantage we have devised a snare from which smaller animals than those to be trapped may escape.

The resetting of a snare trap is also usually of a more complicated kind than the setting of a spring trap in that the spring means have again to be tensioned, the noose again hung and the trigger set. In accordance with our invention this objection has been overcome owing to the fact that the only resetting required is to slip the locking means back along the cable. The overcoming of these and other disadvantages was had in view when devising the snare of our invention as will appear from the following specification and drawings.

The invention has for its general object to provide a snare of the running noose type in which the necessity for the provision of means to exert a pull such as a spring or the like is obviated by so constructing the snare that the noose is automatically locked when tightened on the animal.

A further object of the invention is to provide a running noose snare with locking means of a simple and efficient character not having any working parts that may get out of order.

A further object of the invention is to provide a snare having means to prevent animals of a smaller size than those desired to be trapped from being held in the snare.

A further object of the invention is to provide a snare of the running noose type utilizing a wire cable provided with means for automatically locking the noose in tightened position.

A further object of the invention is to provide a snare of the running noose type formed from wire cable having tightening means for the cable end whereby the snare may be attached to a tree, log, or other suitable object, such tightening means while simple and reliable in operation having no parts subject to wear or deterioration, and enabling the snare to be placed in a minimum of time.

A further object of the invention is to provide a snare of the running noose type in which all the parts may be manufactured at very small cost and are practically indestructible.

Further objects of the invention will hereinafter appear.

In the accompanying drawings a preferred embodiment of the invention adapted for the trapping of wolves is illustrated by way of example only, and it is to be understood that the invention is not in any way limited by the said illustrated embodiment, but only by the scope of the appended claims.

In the accompanying drawings

Fig. 4 is a enlarged detail view in section on the line 4—4 of Fig. 5 of the readily releasable clamp.

Fig. 5 is an enlarged detail view of the readily releasable clamp for attaching the snare to a tree or the like.

In the drawings similar reference numerals indicate similar parts.

1 indicates the cable which in the preferred form is of rustless steel stranded cable, the characteristics of which are extremely well suited to achieve the results intended since it cannot be bitten through by the animal, is supple enough to run freely through the fastening means in its slack position, but has sufficient rigidity to jam or be clamped in said member in its holding position to resist any effort tending to open the tightened noose. Such cable also lends itself to a very simple means of attachment to the fittings forming the locking means and means for fastening the snare to some heavy or immovable object.

2 indicates the locking piece which in the form illustrated is a small mild steel stamping.

3 indicates a stop acting to prevent smaller animals than desired from being held in the snare, and 4 indicates the readily releasable clamp.

Figure 1:
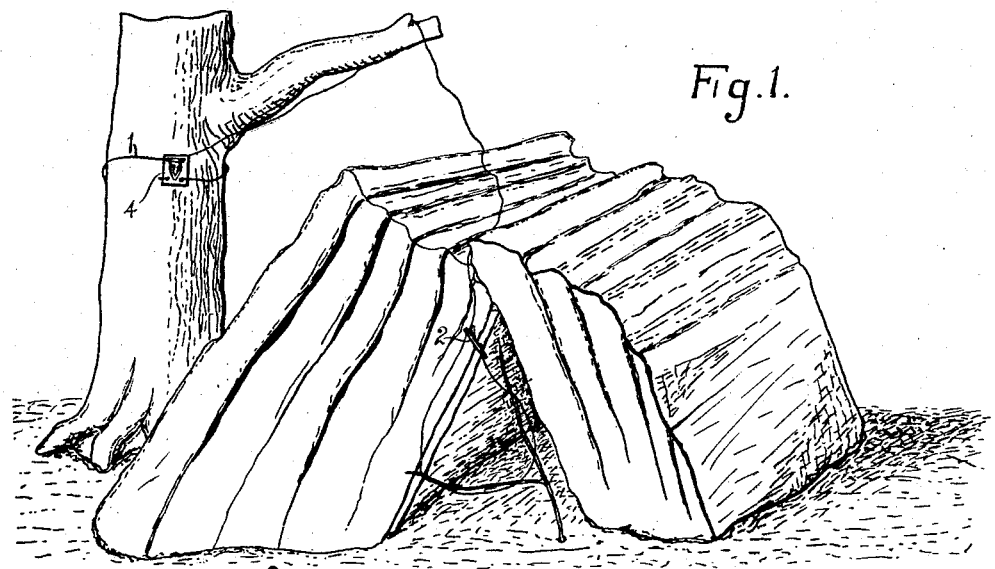
Fig. 1 is a general view of the snare set.
Figure 2:
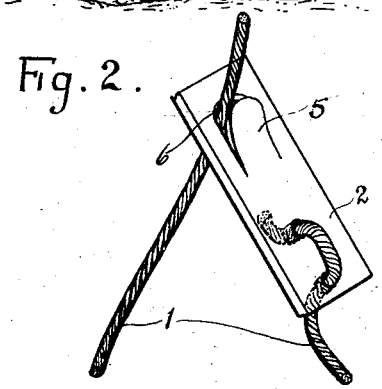
Fig. 2 is a detail view showing the locking means for the running noose in slack position.

As will be realized from Fig. 1, the snare may be rolled into a small compass and a number may be readily carried in the pocket.

The locking means which forms an essential feature of the invention is stamped out to provide a tongue indicated at 5, and this tongue is struck up somewhat at one end from the plane of the locking means, the hole 6 thereby formed in the locking piece being used to guide the cable between the locking piece and the tongue. The cable may be fastened at one end to said locking piece in any suitable manner, but as shown in the drawings we prefer to provide the locking piece with two holes, the steel cable merely being threaded through the holes and being bent at a sharp angle after passing therethrough. The rigidity of the cable is such that when bent through a small arc a very great resistance to dislodgment by a pull on the cable is obtained, such resistance being in part due to the locking effect of the rectangular edges of the bores in the locking piece on the cable. As shown we prefer to solder the end of the cable to prevent unravelling.

The stop 3 in the form shown is merely a press fit on the cable, the snare illustrated being one issued from the factory set to prevent the snaring of animals of less than a certain size. In the form illustrated the stop member is formed as a disc sufficiently large to prevent a cable being drawn through the locking member 2. This disc is provided in manufacture with a pushed out central portion, the stop member is threaded on the cable and the pushed out portion forced back toward the disc until a sufficiently secure engagement with the cable is obtained. It will be realized that the strand formation of the cable cooperates with the edges of the pushed out portion to make a secure binding engagement with the cable.

The stop 3 may of course be placed on the cable during manufacture to form a permanent part of the snare, a variety of snares being carried by the trapper to suit the particular animals desired to be trapped, but even when the stop is thus fixed it is pointed out that adjustment of the noose may be readily effected by pulling more of the free end of the cable through the locking piece. It would also be possible to arrange the stop as an adjustable member by forming it, for instance, in two parts, one of which screws into the other and is arranged as a chuck. It could thus be tightened upon the cable at any desired point.

It will be realized that the nature of the steel cable actively cooperates with the shape of the locking piece to prevent movement of the locking piece back along the cable unless moved by hand.

The tongue is struck up from the locking piece sufficiently to leave space for the cable to run freely between the tongue and the locking piece when the latter is at a fairly sharp angle thereto and inclined forwardly toward the running noose. This is the position naturally assumed by the locking piece on the noose being tightened during which time the run of the cable on which the locking piece moves is substantially straight. The rigidity of the cable is such that while it will flex readily in curves of relatively large radius it has a very considerable resistance to being bent into curves of small radius.

Figure 3:
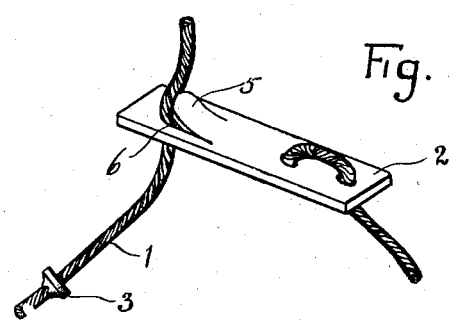
Fig. 3 is a detail view of the locking means showing the same with the noose in tightened position and held by the locking means against movement in a direction to release an animal.

In the tightened position as shown in Fig. 3 the cable is forced into an arc of relatively small radius by the projecting tongue, and presses strongly against the sharp edge thereof. Any effort to move the locking piece back along the cable tends to swing it about a pivot passing through the point at which the cable rests against the edge of the hole 6 in the locking piece, thus forcing the cable to take a curve of still smaller radius and increasingly forcing the tongue against said cable thus increasing the jamming effect.

The snare is preferably designed to catch the animal around the neck or body, since a wolf or fox caught by the paw not only may escape by gnawing off the paw, but by laying the snare on the ground a variety of smaller animals might also be snared. By setting the snare to catch animals by the neck the loop is of course hung well above the ground, and the loop even when tightened may be of a relatively large size, so that smaller animals would probably run below the level of the loop, or if caught would be able to release themselves therefrom, while an animal held by the neck would be quite powerless to release itself. A large loop has a further advantage in that the locking piece is automatically tilted into a jamming position by the fact that the tightening of the loop causes the cable at its attached end to be bent outwardly, thus obtaining the pivoting effect of the locking piece already referred to.

Since there is no relative movement of the locking piece and cable there is practically no wear on the effective edge of the tongue 5, so that the snare is substantially proof against becoming inoperative through long continued use. The material from which the locking piece is made is preferably formed from rust-proof material, but even should rusting occur the light friction of the stranded cable would serve to keep the operative edges of the locking piece free from rust.

The snare is adapted to be anchored to an object such as a fallen tree or the like, by means of a readily releasable clamp formed like the locking piece from a mild steel stamping. This clamping piece is preferably provided with two holes serving to attach the cable in the same manner as used for the locking piece, but of course any other suitable method of attachment may be used.

The clamping member essentially comprises an aperture through which a loop of the cable may be passed, and a projection over which the loop may be placed. As before stated the stranded wire cable while sufficiently flexible to run easily through the apertures in the locking and clamping pieces when straight or slightly curved, has considerable resistance to bending into an arc of small radius, this resistance being exerted against the edges of the apertures in the pieces. The cable when placed in the clamping piece is bent into an arc of relatively small radius, and the effort of this bent portion to increase the radius of curvature is sufficient to maintain the clamp securely in position on the cable even when the latter is slack. The pull on the cable by the trapped animal acts to force the cable into sharp bends at the point where it passes into and out of the aperture 9 and still further increases the clamping effect, preventing any possibility of disengagement of the cable from the clamp.

Figures 4, 5:
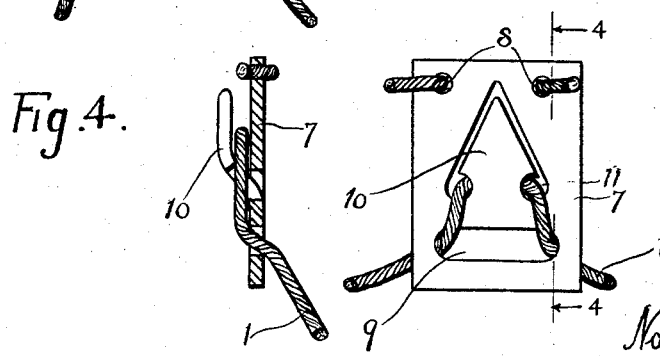

In the form illustrated in Fig. 4 the clamp comprises a plate 7 provided with apertures 8 for securing one end of the cable to the plate, the aperture 9 through which a loop of the cable may be passed and a projection 10 struck up from the plate. This projection is preferably as shown in the form of an arrow head pointing away from the aperture 9 thus facilitating the slipping of the loop thereover. It will be noticed that the projections are provided with cutaway portions 11 at the base in which the cable may lie snugly. It will be seen that all that is necessary to free the clamp is to push the loop a little through the clamp so that the loop passes over the projection 10, and to tilt the loop over said projection and withdraw it through the aperture 9.

It is believed that sufficient description of the invention has been given to enable anyone conversant with snares to fully understand the novel features thereof, and that it will be realized that we have provided a very efficient, simple, economical and durable snare having valuable and novel features.

What we claim is:—

1. An animal snare comprising a flexible member, a rigid apertured locking member attached to one end thereof, a tongue adjacent said aperture and at an angle to the plane of said locking member adapted to grip said flexible member in said aperture upon relative angular movement between said locking member and said flexible member.

2. An animal snare comprising a flexible member, a rigid locking piece on one end thereof and having an aperture adapted to allow passage therethrough of said member and a tongue formed integrally with said locking piece and adjacent said aperture adapted to grip said member in said aperture upon relative angular movement between the member and locking piece, and means for fastening said snare in position.

3. For an animal trap of the running noose type a locking member comprising a rigid metallic piece, having means adapted to attach a flexible member thereto and having an aperture adapted to allow passage of said flexible member therethrough, and a rigid tongue integral with said piece, at an angle to the same and adapted to grip said flexible member in said aperture upon relative angular motion between said piece and said flexible member.

In testimony whereof we have affixed our signatures.

NORMAN R. CARR.
CLAUDE C. MILLER.